UNITED STATES PATENT OFFICE.

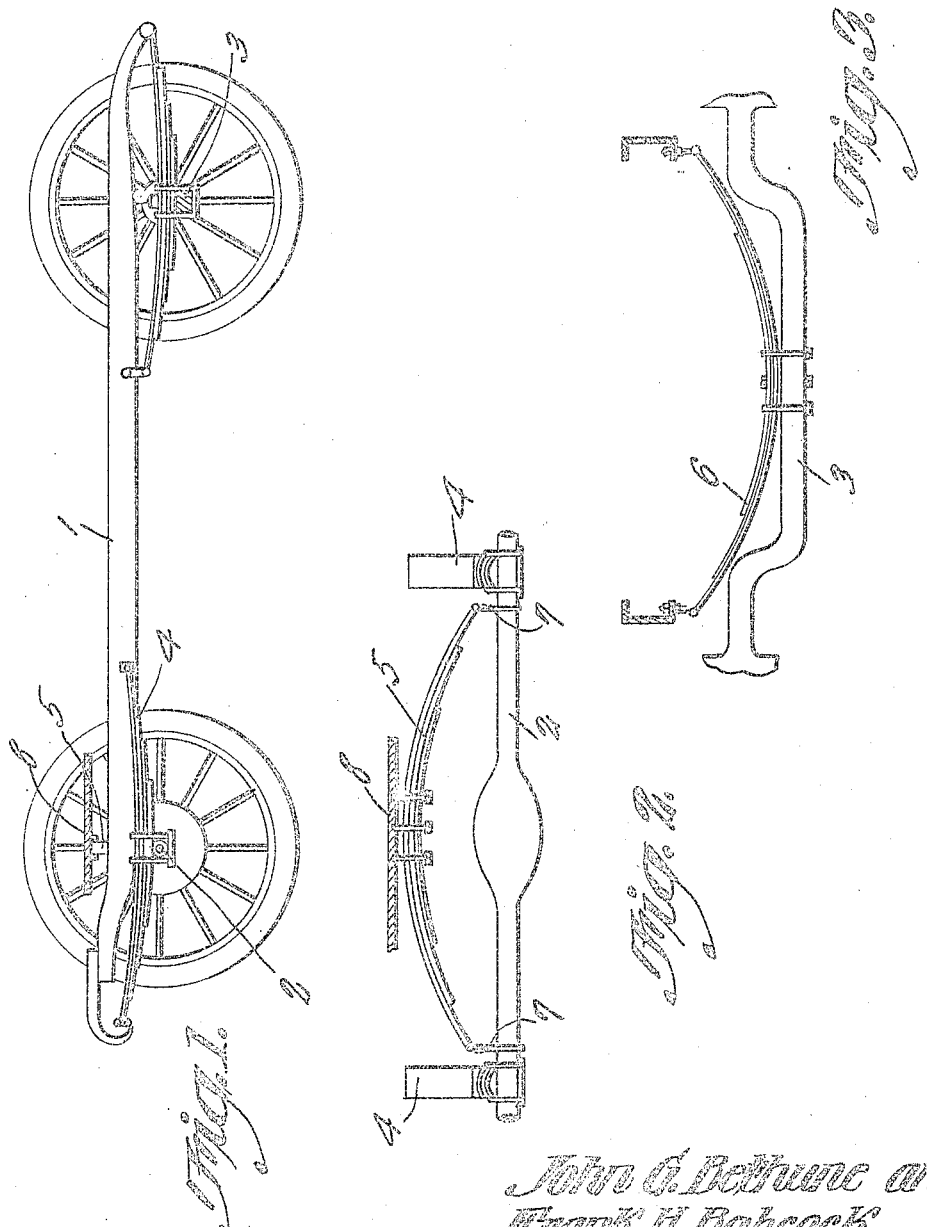

JOHN G. BETHUNE AND FRANK H. BABCOCK, OF PUNXSUTAWNEY, PENNSYLVANIA.

SHOCK-ABSORBER.

1,102,858.

Specification of Letters Patent.  Patented July 7, 1914.

Application filed November 23, 1912. Serial No. 733,163.

*To all whom it may concern:*

Be it known that we, JOHN G. BETHUNE and FRANK H. BABCOCK, citizens of the United States, residing at Punxsutawney, in the county of Jefferson, State of Pennsylvania, have invented a new and useful Shock-Absorber, of which the following is a specification.

This invention relates to shock absorbers for automobiles and other vehicles, one of its objects being to provide a simple and inexpensive form of device of this character which can be applied readily to vehicles already in use and which operates efficiently to retard the upward movement or rebound of a vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of our invention has been shown.

In said drawings:—Figure 1 is a longitudinal section through the running gear of a vehicle with the present improvements combined therewith. Fig. 2 is a rear elevation of a portion of the rear axle of the vehicle and showing the shock absorber in position thereon. Fig. 3 is a similar view of a portion of the front axle with the shock absorbing spring in position.

Referring to the figures by characters of reference 1 designates the chassis of a motor vehicle the same being provided with a rear axle 2 and a front axle 3. The vehicle is provided with the usual laminated springs 4 whereby the downward movement of the chassis relative to the axles is retarded during the jolting of the machine. In order that the upward movement of the chassis may be similarly retarded, cushioning springs of novel form have been provided in addition to the usual laminated springs 4. Each of these shock absorbing springs is preferably laminated, as illustrated at 5 and 6 in Figs. 2 and 3 respectively. The spring 5 is designed to be used in connection with the rear axle 2 and has its ends connected to the axle, as shown at 7 while its intermediate portion is secured to the chassis as shown at 8, the laminæ of the spring being arranged upon the lower or concave portion thereof. This arrangement of parts is employed for the reason that the spring is constantly under tension and, when the chassis 1 begins its upward movement, the said spring immediately exerts a restraining action thereon, there being no interval during which the spring does not actively draw upon the chassis. Importance is attached to the fact that the spring is constantly under tension as the chassis is thus maintained between two opposed forces, to wit, that exerted upwardly by the springs 4 and that exerted downwardly by the spring 5.

The front axle 3, which is not provided with a differential, can have secured to its center a spring 6 which is the exact reverse of the spring 5, the ends of this spring 6 being attached to the chassis 1. The action of this spring is the same as that of spring 5, it being understood that the spring 6 is constantly under tension so as to pull the chassis downwardly and thus cause it to hold the springs 4 under tension.

What is claimed is:—

The combination with the axle and body of a vehicle, of laminated cushioning springs each secured at its center to the axle and at its ends to the body, and a bowed laminated shock absorbing spring in the same vertical plane with the axle and secured to the body and axle, said shock absorbing spring being between and spaced from the cushioning springs and all of the springs being constantly under tension, the short laminæ of the shock absorbing spring forming the concave surface of said spring, and the short laminæ of said cushioning springs forming the convex surfaces of said springs.

In testimony that we claim the foregoing as our own, we have hereto affixed our signatures in the presence of two witnesses.

DR. JOHN G. BETHUNE.
FRANK H. BABCOCK.

Witnesses:
J. L. BRADY,
A. M. MEANS.